(12) United States Patent
Hicks et al.

(10) Patent No.: US 8,200,636 B2
(45) Date of Patent: Jun. 12, 2012

(54) DATABASE INSTANCE DECOMMISSIONING SYSTEM AND METHOD

(75) Inventors: Scott D. Hicks, Underhill Center, VT (US); James A. Martin, Jr., Endicott, NY (US); Douglas G. Murray, Johnson City, NY (US); Diane C. Rauch, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 11/076,689

(22) Filed: Mar. 10, 2005

(65) Prior Publication Data

US 2006/0206528 A1 Sep. 14, 2006

(51) Int. Cl.
*G06F 7/00* (2006.01)
*G06F 17/00* (2006.01)

(52) U.S. Cl. ........................................................ 707/661
(58) Field of Classification Search .................. None
See application file for complete search history.

(56) References Cited

U.S. PATENT DOCUMENTS

| | | | |
|---|---|---|---|
| 5,907,675 A * | 5/1999 | Aahlad | 709/203 |
| 6,516,055 B1 | 2/2003 | Bedeski et al. | |
| 6,574,617 B1 * | 6/2003 | Immerman et al. | 707/1 |
| 6,910,070 B1 * | 6/2005 | Mishra et al. | 709/224 |
| 2002/0120538 A1 | 8/2002 | Corrie et al. | |

OTHER PUBLICATIONS

Oracle Enterprise Manager, Adminstrator's Guide, Release 9.2.0, Mar. 2002, Part No. A96670-01, Chapters 1, 8, 9 and 11.*
Oracle Email, Administrator's Guide, Release 9.0.3, Aug. 2002, Part No. B10033-1, Chapters 1 and 2.*
Oracle 9i Database Installation Guide, Release 2(9.2.0.1.0) for Windows, May 2002, Part No. A95493-01, Chapters 1 and 4.*
Oracle9i Database Administrator's Guide, Release 2 (9.2), Mar. 2002, Part No. A96521-01, Chapter 4.*
Oracle Enterprise Manager, Administrators Guide, Release 9.2.0, Mar. 2002, Part No. A96670-01, Chapters 1, 8, 9, 10 and 11, Chapter 10, 32 pages, included with this office action, chapters 1, 8, 9 and 11 included with previous office action.*
Oracle Email, Administrators Guide, Release 9.0.3, Aug. 2002, Part No. B10033-1, Chapters 1 and 2, included with previous office action.*
Oracle 9i Database Installation Guide, Release 2(9.2.0.1.0) for Windows, May 2002, Part No. A95493-01, Chapters 1 and 4, included with previous office action.*
Oracle Database Administrator's Guide, Release 2(9.2), Mar. 2002, Part No. A96521-01, Chapter 4, included with previous office action.*
Boden, Black's Veterinary Dictionary, 1998, 19th ed, p. 81.*
Holloway, Oracle Database Connection Strings in PHP, Apr. 20, 2006 Oracle.com, http://blogs.oracle.com/alison/2006/04/oracle_database_connection_str.html (Accessed Dec. 19, 2008).*

(Continued)

*Primary Examiner* — Pierre Vital
*Assistant Examiner* — Jason Liao
(74) *Attorney, Agent, or Firm* — Anna L. Linne; Hoffman Warnick LLC

(57) ABSTRACT

A system, method and program product for decommissioning database instances. A computer system is disclosed that includes an agent processing system that deactivates agents associated with a database instance; an access processing system that restricts further access to the database instance; and a mailer processing system that deactivates mailing transactions associated with the database instance.

20 Claims, 5 Drawing Sheets

OTHER PUBLICATIONS

Lorentz, Oracle 9i SQL Reference Part No. A96540-02, 2002, Oracle, Release 2 (9.2), http://download.oracle.com/docs/cd/B10500_01/server.920/a96540.pdf.*

Oracle 9i Database Search Results: decommission, accessed Jan. 30, 2012, Oracle, http://www.oracle.com/pls/db92/search?remark=&word=decommission&book=&preference=.*

Cowles, database decomission checklist, 09 [accessed Jan. 30, 2012], freelists.org, http://www.freelists.org/post/oracle-I/database-decommission-checklist.*

Decomissioning Checklist—DRAFT, Sep. 13, 2007 [accessed Jan. 20, 2012], purdue.edu, http://www.purdue.edu/ssta/committees/csac/minutes/2007/files/Decommissioning%20Checklist091207.pdf.*

* cited by examiner

DATABASE INSTANCE DECOMMISSIONING SYSTEM AND METHOD

BACKGROUND OF THE INVENTION

1. Technical Field

The present invention relates generally to database management, and more specifically relates to a process for decommissioning database instances on-demand in large scale projects.

2. Related Art

Many large scale projects, such as enterprise-wide information technology (IT) migrations, utilize databases to help manage processes such as progress reports, billing, workflow, etc. If the project is large enough, a single database may prove to be unwieldy, e.g., requiring the management of data from many different sites within an organization, requiring the management of data from a series of sub-projects, etc.

One way to address the problem is to maintain a single database design and create instances of the database "on demand" as required for different durations during the execution of the project. In this way, data can be managed using the same database rules and processes by different groups or at different times throughout the organization. For instance, one site within the organization may be involved in a first phase of the project and require the database from January to August, while a second site may be involved in a second phase, and require use of the database from June through December. Effectively managing the lifecycles of the database instances is critical in order to avoid wasting of time and resources.

Unfortunately, without a standardized approach to decommissioning database instances, the process of providing on-demand database instances to address the above need would not only be costly, but would also be wrought with potential errors. Accordingly, a need exists for a standardized process of decommissioning database instances.

SUMMARY OF THE INVENTION

The present invention addresses the above-mentioned problems, as well as others, by providing a database instance decommissioning system that can automate that process of decommissioning database instances when they are no longer required to be in an active status. Using the system, instances can be decommissioned "on-demand" using a standardized process.

In a first aspect, the invention provides a computer system having a database instance decommissioning system, comprising: an agent processing system that deactivates agents associated with a database instance; an access processing system that restricts further access to the database instance; and a mailer processing system that deactivates mailing transactions associated with the database instance.

In a second aspect, the invention provides a computerized method for decommissioning database instances, comprising: providing a database instance decommissioning tool that includes a plurality of screen interface views for automating a series of steps in a decommissioning process; receiving a request to deactivate a database instance; deactivating all agents associated with a database instance; restricting further access to the database instance; and deactivating mailing transactions associated with the database instance.

In a third aspect, the invention provides a program product stored on a computer readable medium for decommissioning database instances, comprising: program code configured for deactivating agents associated with a database instance; program code configured for restricting further access to the database instance; and program code configured for deactivating mailing transactions associated with the database instance.

In a fourth aspect, the invention provides a method for deploying an application for decommissioning database instances, comprising: providing a computer infrastructure being operable to: deactivate agents associated with a database instance; restrict further access to the database instance; and deactivate mailing transactions associated with the database instance.

In a fifth aspect, the invention provides computer software embodied in a propagated signal for managing database instances, the computer software comprising instructions to cause a computer to perform the following functions: deactivate agents associated with a database instance; restrict further access to the database instance; and deactivate mailing transactions associated with the database instance.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
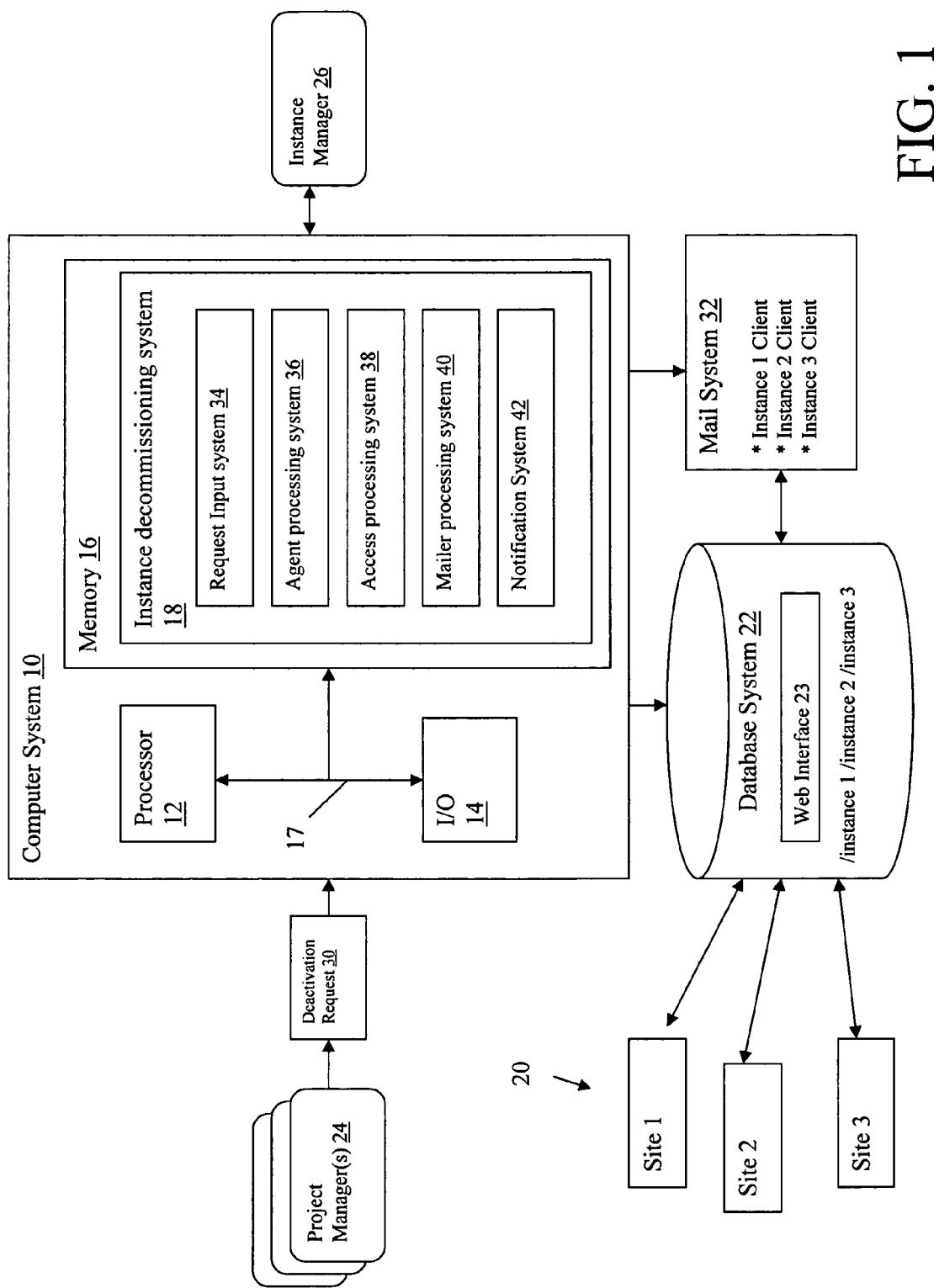
FIG. 1 depicts a computer system having a database instance decommissioning system in accordance with the present invention.

Referring now to the drawings, FIG. 1 depicts a computer system 10 having a database instance decommissioning system 18 for managing the process of deactivating database instances that are accessible to one or more sites 20. Instance decommissioning system 18 may be implemented as a software tool that includes different views or screens for managing the different steps involved in the process.

In general, computer system 10 may comprise, e.g., a desktop, a laptop, a workstation, etc. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Instances may be created and stored in database system 22 by any process. Database system 22 may be implemented a separate computer system and may comprise any type of database application that includes one or more storage devices, such as RAM, ROM, a magnetic disk drive and/or an optical disk drive. Data storage could also be distributed across, for example, a local area network (LAN), wide area network (WAN) or a storage area network (SAN) (not shown). Mail system 32 may likewise be implemented on a computer system and include any email clients created for each of the database instances. Mail system 32 may be implemented separately from, or be integrated into, database system 22.

Access to computer system 10, database system 22, and mail system 32 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

As noted above, instance decommissioning system 18 includes various mechanisms for managing and automating the process of decommissioning database instances. These mechanisms generally include a request input system 34, an agent processing system 36, an access processing system 38, a mailer processing system 40, and a notification system 42.

The process of decommissioning a database instance begins when a project manager 24 (or the like) submits a deactivation request 30 to the instance decommissioning system 18. The deactivation request 30 includes any information required to deactivate the instance, such as a name of the instance, etc. The deactivation request 30 may be submitted in any manner, e.g., as an email, as an on-line form, etc.

Figure 2:
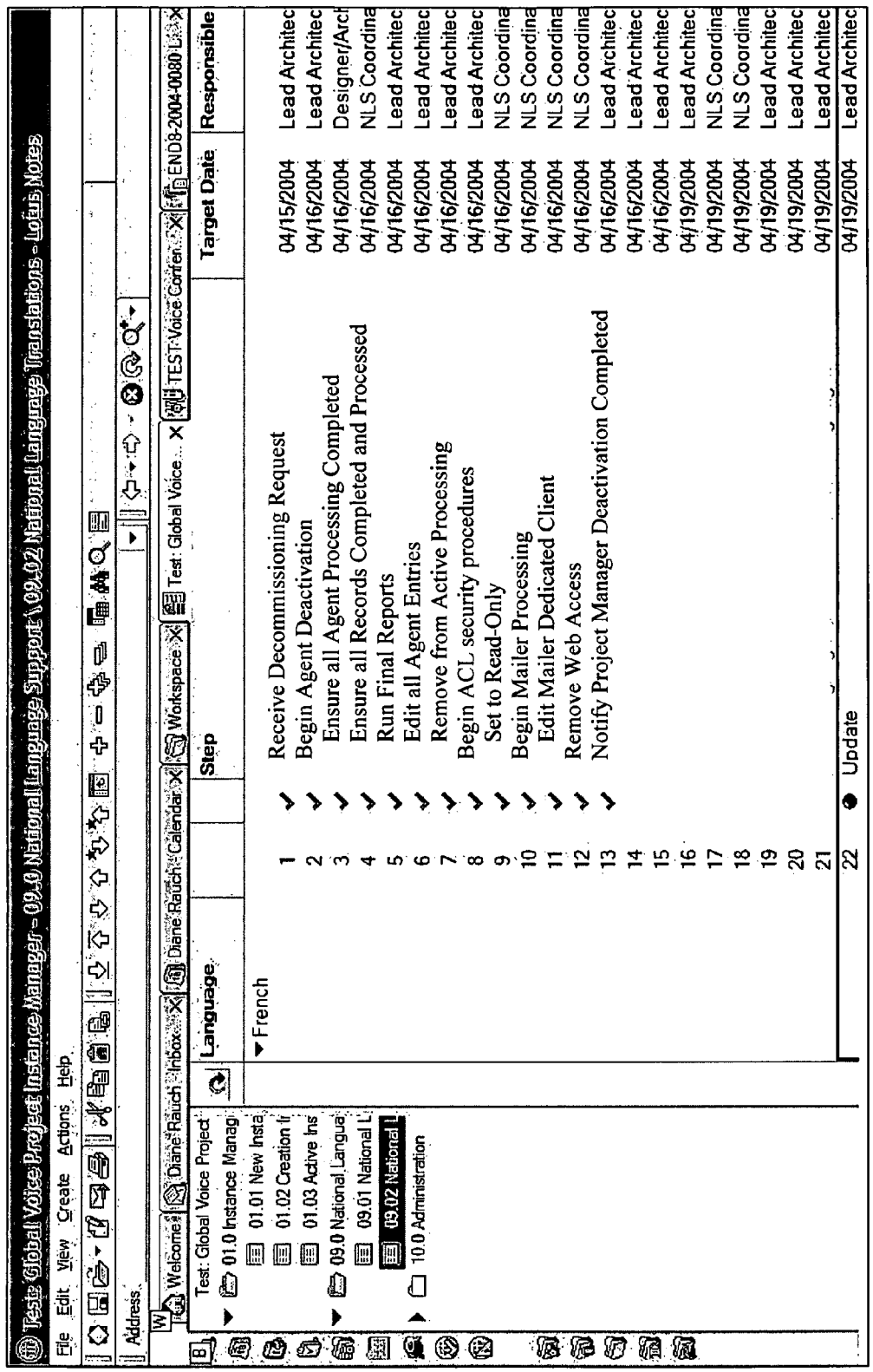
FIG. 2 depicts a screen interface view showing a check list of actions required to decommission a database instance.

After instance decommissioning system 18 captures the details from the deactivation request 30, an instance manager 26 may begin the process of decommissioning the database instance. Instance manager 26 may typically be the person overseeing the instance decommissioning system 18. Instance manager 26 could also be implemented as a programmable agent or the like that controls instance decommissioning system 18 in an automated fashion. In one illustrative embodiment, each of the steps required to decommission the instance may be displayed as a series of steps, such as that shown in FIG. 2. After each step is completed, the step can be checked. Each step may be implemented as a manual and/or automatic process, and the ordering of the steps need not be in any particular order.

Figure 3:
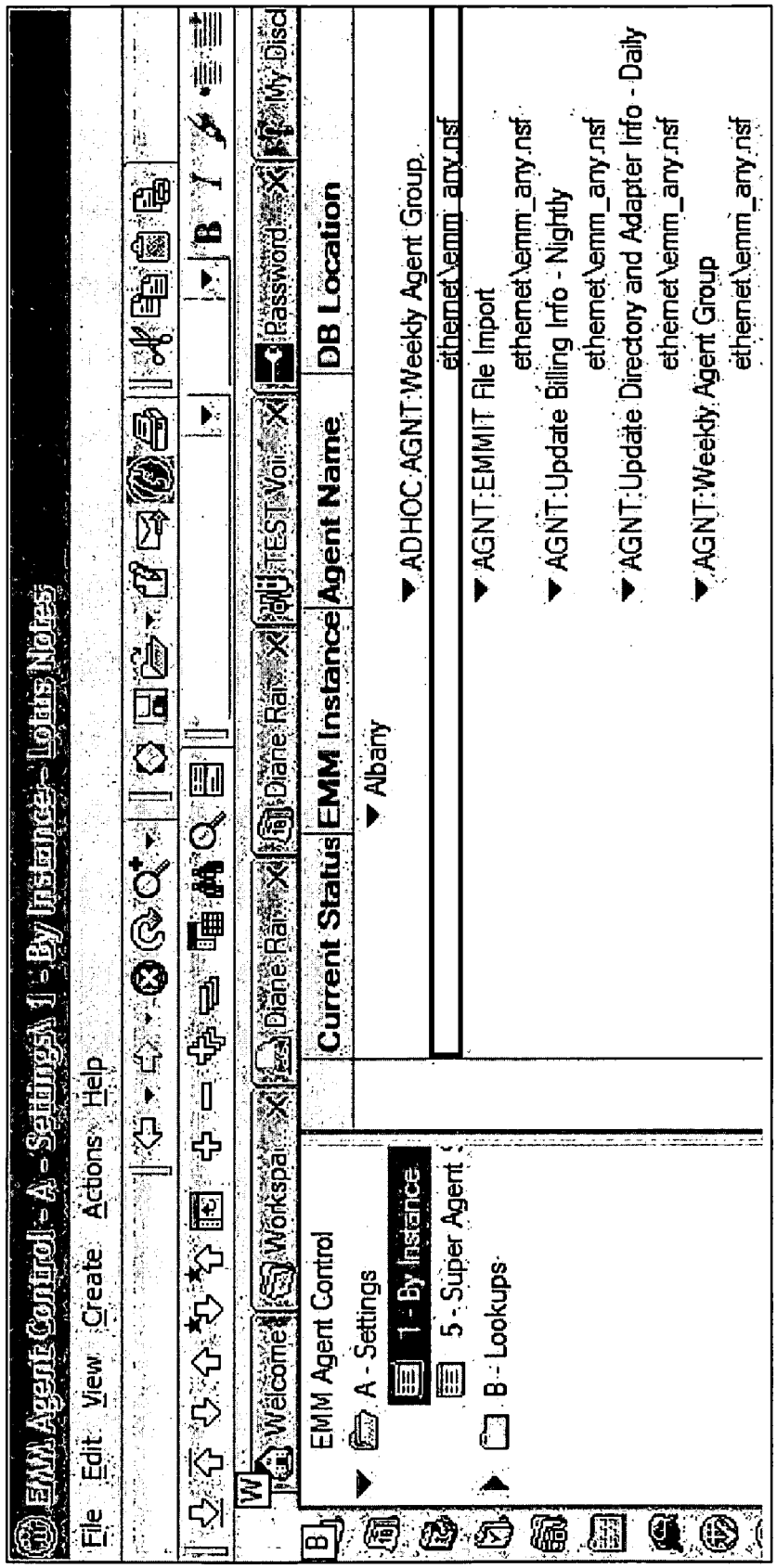
FIG. 3 depicts a screen interface view for processing agents in accordance with the present invention.

Agent processing system 36 is responsible for deactivating any agents that were set up for the instance. Agents may include, for example, the automatic processing of data, such as downloading or uploading billing information to a centralized site. FIG. 3 depicts an illustrative screen interface utilized by agent processing system 36. In this example, the instance "Albany" has been selected, which causes the list of agents set up for the instance to be depicted. The instance manager 26 is then able to select an agent (e.g., "AGNT: EMMIT File Import") to view the details of the selected agent, and make any necessary changes. Before allowing an agent to be deactivated, agent processing system 36 ensures that all processing controlled by the agents has been completed, e.g., all records are completed and processed, final reports have been generated, etc. Once all processing is complete, instance manager 26 can deactivate the agents by editing the entries to remove the agents from active processing.

Figure 4:
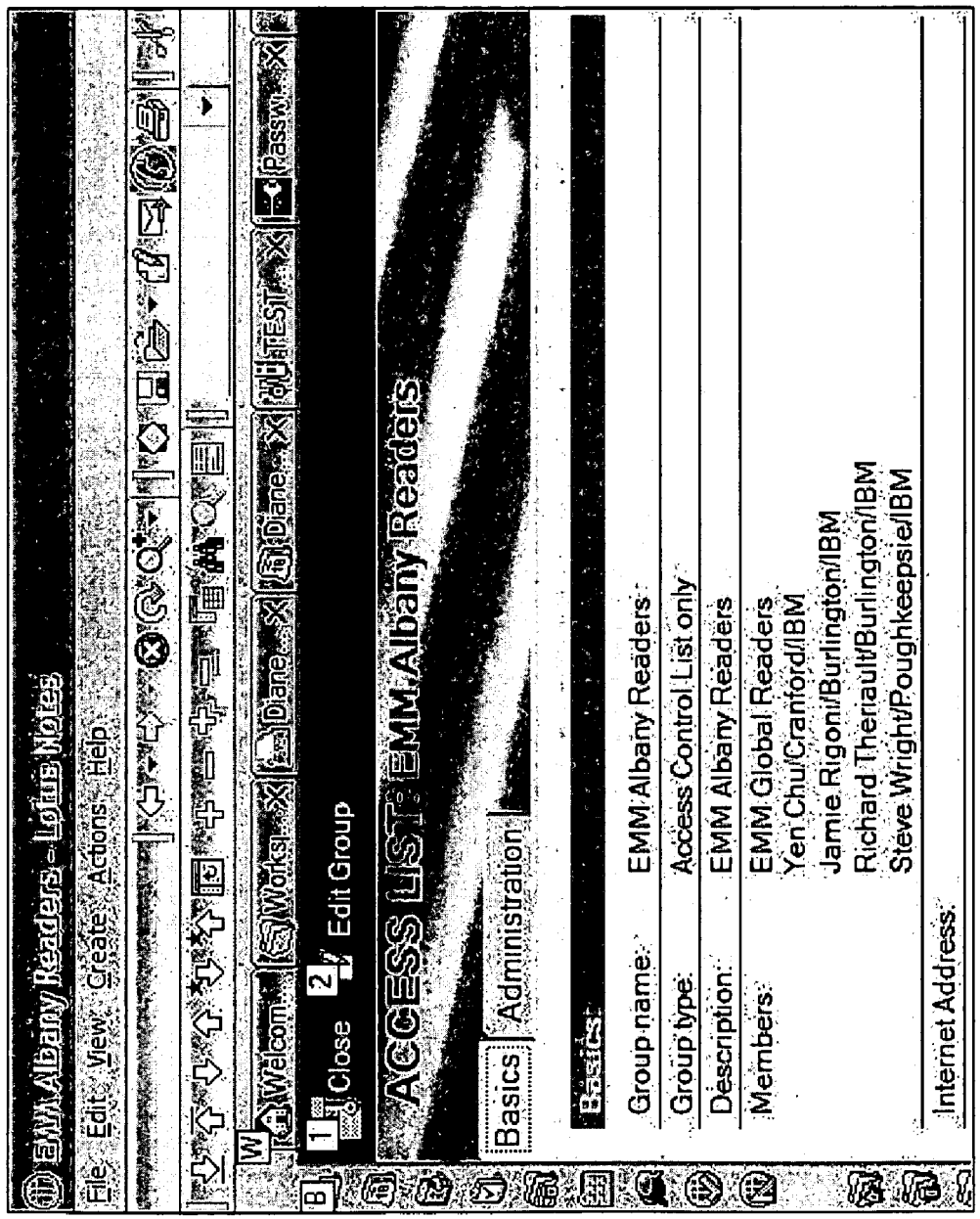
FIG. 4 depicts a screen interface view for managing access in accordance with the present invention.

Next, access processing system 38 is utilized to restrict access to the instance. Each instance may be set up with one or more access control lists (ACLs) that determines which users have access to the instance, and what their privilege levels are. For example, some user ID's may have administrative privileges, while others only have read-write privileges, etc. Access processing system 38 sets each of the ACLs to a read-only status, allowing no further writes to the database. FIG. 4 depicts an illustrative interface used by access processing system 38. In this example, each ACL group (e.g., "EMM Albany Readers") can be displayed and then administered by clicking on the "Administration" tab. From the administration screen (not shown), the instance manager 26 is able to change privileges to read-only.

Access processing system 38 may also provide a mechanism for deleting access to the database instance in the database system 22 via web interface 23. This may be accomplished by editing or removing access to an initialization file on a web page at the web interface 23.

Figure 5:
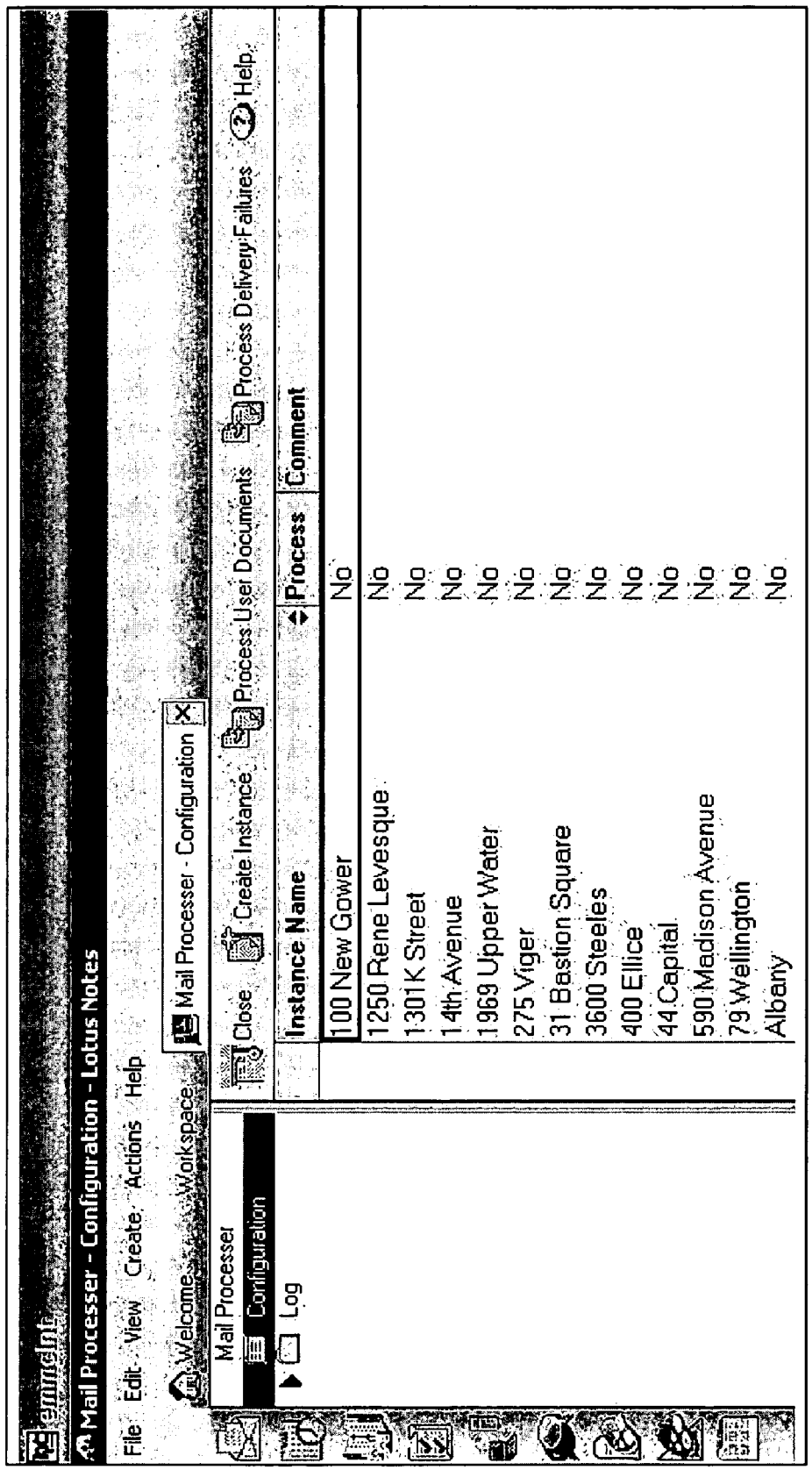
FIG. 5 depicts a screen interface view for managing mail processing in accordance with the present invention.

Mailer processing system 40 is utilized to deactivate the mailer database agent within the mail system 32 for the instance being decommissioned. This may be implemented by modifying the mailer client to prevent any further mailing transactions. FIG. 5 depicts an illustrative interface for enabling/disabling mailer clients. In this example, a list of instances is presented, along with their "Process" status. In this case, all of depicted instances are disabled (i.e., set to "No"). Thus, none of the instances have enabled mailer clients.

Finally, notification system 42 generates a notification to the project manager 24 that the decommissioning process is complete.

It should be appreciated that the teachings of the present invention could be offered as a business method on a subscription or fee basis. For example, a computer system 10 comprising instance decommissioning system 18 could be created, maintained and/or deployed by a service provider that offers the functions described herein for customers. That is, a service provider could offer to create and manage database instances as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system —is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computer system comprising:
a set of computing devices for managing a database instance by performing a method comprising:
receiving a decommissioning request for the database instance; and
managing a decommissioning process for the database instance in response to the decommissioning request, wherein the decommissioning process results in processing of data stored in the database instance being deactivated while maintaining read only access to the data stored in the database instance, and wherein the decommissioning process managing includes:
generating a series of decommissioning steps required for the decommissioning process, the series of decommissioning steps including an agent deactivation step and an access limitation step;
providing a decommissioning graphical user interface for use by an instance manager overseeing the decommissioning process, wherein the decommissioning graphical user interface includes data identifying each of the series of decommissioning steps and a completion status for each of the series of decommissioning steps;
providing an agent deactivation graphical user interface for use by the instance manager, wherein the agent deactivation graphical user interface provides the instance manager with data corresponding to a set of agents corresponding to the database instance and enables the instance manager to request deactivation of an agent in the set of agents, wherein each agent in the set of agents is set up to perform automatic processing of data stored in the database instance, and wherein completion of the agent deactivation step occurs when each agent in the set of agents is deactivated; and
providing an access limitation graphical user interface for use by the instance manager, wherein the access limitation graphical user interface provides the instance manager with data corresponding to a set of access privileges and enables the instance manager to request a change to an access privilege in the set of access privileges, and wherein completion of the access limitation step occurs when all access privileges are set to read only.

2. The computer system of claim 1, wherein the series of decommissioning steps further includes a mailer deactivation step, and wherein the decommissioning process managing further includes providing a mailer deactivation graphical user interface for use by the instance manager, wherein the mailer deactivation graphical user interface enables the instance manager to request deactivation of a mailer database agent associated with the database instance.

3. The computer system of claim 1, wherein the decommissioning process managing further includes:
receiving a deactivation request for an agent in the set of agents;
determining whether all processing controlled by the agent has been completed; and
deactivating the agent in response to the deactivation request and a determination that all processing controlled by the agent has completed.

4. The computer system of claim 1, wherein the database instance can be accessed via a web interface prior to the decommissioning process, and wherein the decommissioning process managing further includes deleting access to the database instance via the web interface.

5. The computer system of claim 1, wherein the decommissioning request is generated by a project manager assigned to a project utilizing the database instance, the method further comprising providing a notification for presentation to the project manager in response to completion of the decommissioning process.

6. The computer system of claim 1, wherein the decommissioning graphical user interface further includes a target date for completion of each of the series of decommissioning steps and a responsible party for each of the series of decommissioning steps.

7. The computer system of claim 1, wherein at least one of the series of decommissioning steps includes a plurality of sub-steps, and wherein the decommissioning graphical user interface further includes data identifying each of the plurality of sub-steps and a completion status for each of the plurality of sub-steps.

8. A computerized method of managing a database instance, the method comprising:
receiving a decommissioning request for the database instance on a computer system; and
the computer system managing a decommissioning process for the database instance in response to the decommissioning request, wherein the decommissioning process results in processing of data stored in the database instance being deactivated while maintaining read only access to the data stored in the database instance, and wherein the decommissioning process managing includes:
generating a series of decommissioning steps required for the decommissioning process, the series of decommissioning steps including an agent deactivation step and an access limitation step;
providing a decommissioning graphical user interface for use by an instance manager overseeing the decommissioning process, wherein the decommissioning graphical user interface includes data identifying each of the series of decommissioning steps and a completion status for each of the series of decommissioning steps;
providing an agent deactivation graphical user interface for use by the instance manager, wherein the agent deactivation graphical user interface provides the instance manager with data corresponding to a set of agents corresponding to the database instance and enables the instance manager to request deactivation of an agent in the set of agents, wherein each agent in the set of agents is set up to perform automatic processing of data stored in the database instance, and wherein completion of the agent deactivation step occurs when each agent in the set of agents is deactivated; and providing an access limitation graphical user interface for use by the instance manager, wherein the access limitation graphical user interface provides the instance manager with data corresponding to a set of access privileges and enables the instance manager to request a change to an access privilege in the set of access privileges, and wherein completion of the access limitation step occurs when all access privileges are set to read only.

9. The method of claim 8, wherein the series of decommissioning steps further includes a mailer deactivation step, and wherein the decommissioning process managing further includes providing a mailer deactivation graphical user interface for use by the instance manager, wherein the mailer deactivation graphical user interface enables the instance manager to request deactivation of a mailer database agent associated with the database instance.

10. The method of claim 8, wherein the decommissioning process managing further includes:
receiving a deactivation request for an agent in the set of agents;
determining whether all processing controlled by the agent has been completed; and
deactivating the agent in response to the deactivation request and a determination that all processing controlled by the agent has completed.

11. The method of claim 8, wherein the database instance can be accessed via a web interface prior to the decommissioning process, and wherein the decommissioning process managing further includes deleting access to the database instance via the web interface.

12. The method of claim 8, wherein the decommissioning request is generated by a project manager assigned to a project utilizing the database instance, the method further comprising providing a notification for presentation to the project manager in response to completion of the decommissioning process.

13. The method of claim 8, wherein the decommissioning graphical user interface further includes a target date for completion of each of the series of decommissioning steps and a responsible party for each of the series of decommissioning steps.

14. A program product stored on a computer readable storage device, the program product including program code, which when executed, causes a computer system to perform a method of managing a database instance, the method comprising:
receiving a decommissioning request for the database instance; and
managing a decommissioning process for the database instance in response to the decommissioning request, wherein the decommissioning process results in processing of data stored in the database instance being deactivated while maintaining read only access to the data stored in the database instance, and wherein the decommissioning process managing includes:
generating a series of decommissioning steps required for the decommissioning process, the series of decommissioning steps including an agent deactivation step and an access limitation step;

providing a decommissioning graphical user interface for use by an instance manager overseeing the decommissioning process, wherein the decommissioning graphical user interface includes data identifying each of the series of decommissioning steps and a completion status for each of the series of decommissioning steps;

providing an agent deactivation graphical user interface for use by the instance manager, wherein the agent deactivation graphical user interface provides the instance manager with data corresponding to a set of agents corresponding to the database instance and enables the instance manager to request deactivation of an agent in the set of agents, wherein each agent in the set of agents is set up to perform automatic processing of data stored in the database instance, and wherein completion of the agent deactivation step occurs when each agent in the set of agents is deactivated; and providing an access limitation graphical user interface for use by the instance manager, wherein the access limitation graphical user interface provides the instance manager with data corresponding to a set of access privileges and enables the instance manager to request a change to an access privilege in the set of access privileges, and wherein completion of the access limitation step occurs when all access privileges are set to read only.

15. The program product of claim 14, wherein the series of decommissioning steps further includes a mailer deactivation step, and wherein the decommissioning process managing further includes providing a mailer deactivation graphical user interface for use by the instance manager, wherein the mailer deactivation graphical user interface enables the instance manager to request deactivation of a mailer database agent associated with the database instance.

16. The program product of claim 14, wherein the decommissioning process managing further includes:
receiving a deactivation request for an agent in the set of agents;
determining whether all processing controlled by the agent has been completed; and
deactivating the agent in response to the deactivation request and a determination that all processing controlled by the agent has completed.

17. The program product of claim 14, wherein the database instance can be accessed via a web interface prior to the decommissioning process, and wherein the decommissioning process managing further includes deleting access to the database instance via the web interface.

18. The program product of claim 14, wherein the decommissioning request is generated by a project manager assigned to a project utilizing the database instance, the method further comprising providing a notification for presentation to the project manager in response to completion of the decommissioning process.

19. The program product of claim 14, wherein the decommissioning graphical user interface further includes a target date for completion of each of the series of decommissioning steps and a responsible party for each of the series of decommissioning steps.

20. A method for deploying a computer system for managing a database instance, the method comprising:
configuring the computer system to manage the database instance by:
receiving a decommissioning request for the database instance; and managing a decommissioning process for the database instance in response to the decommissioning request, wherein the decommissioning process results in processing of data stored in the database instance being deactivated while maintaining read only access to the data stored in the database instance, and wherein the decommissioning process managing includes:

generating a series of decommissioning steps required for the decommissioning process, the series of decommissioning steps including an agent deactivation step and an access limitation step;

providing a decommissioning graphical user interface for use by an instance manager overseeing the decommissioning process, wherein the decommissioning graphical user interface includes data identifying each of the series of decommissioning steps and a completion status for each of the series of decommissioning steps;

providing an agent deactivation graphical user interface for use by the instance manager, wherein the agent deactivation graphical user interface provides the instance manager with data corresponding to a set of agents corresponding to the database instance and enables the instance manager to request deactivation of an agent in the set of agents, wherein each agent in the set of agents is set up to perform automatic processing of data stored in the database instance, and wherein completion of the agent deactivation step occurs when each agent in the set of agents is deactivated; and providing an access limitation graphical user interface for use by the instance manager, wherein the access limitation graphical user interface provides the instance manager with data corresponding to a set of access privileges and enables the instance manager to request a change to an access privilege in the set of access privileges, and wherein completion of the access limitation step occurs when all access privileges are set to read only.

* * * * *